US009330662B2

(12) United States Patent
Fujimura et al.

(10) Patent No.: US 9,330,662 B2
(45) Date of Patent: May 3, 2016

(54) PATTERN CLASSIFIER DEVICE, PATTERN CLASSIFYING METHOD, COMPUTER PROGRAM PRODUCT, LEARNING DEVICE, AND LEARNING METHOD

(71) Applicant: KABUSHIKI KAISHA TOSHIBA, Minato-ku, Tokyo (JP)

(72) Inventors: Hiroshi Fujimura, Yokohama (JP); Takashi Masuko, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 157 days.

(21) Appl. No.: 14/162,888

(22) Filed: Jan. 24, 2014

(65) Prior Publication Data

US 2014/0257810 A1  Sep. 11, 2014

(30) Foreign Application Priority Data

Mar. 7, 2013 (JP) ................................ 2013-045895

(51) Int. Cl.
 *G10L 15/08* (2006.01)
 *G10L 15/187* (2013.01)
 *G10L 15/02* (2006.01)

(52) U.S. Cl.
 CPC .............. *G10L 15/08* (2013.01); *G10L 15/187* (2013.01); *G10L 2015/025* (2013.01)

(58) Field of Classification Search
 CPC .. G06K 9/00248; G06K 9/6257; G10L 15/08; G10L 15/187; G10L 2015/025
 USPC .......................................... 704/243; 382/159
 See application file for complete search history.

(56) References Cited

U.S. PATENT DOCUMENTS

2011/0235901 A1* 9/2011 Hu ................................ 382/159

OTHER PUBLICATIONS

Freund et al, A Decision-Theoretic Generalization of on-line Learning and an Application to Boosting, EuroCOLT, 95 Proc., of the 2nd EP Conference on Computational Learning Theory, pp. 23-37.
Li et al., Statistical Learning of Multi-View Face Detection, ECCV 2002.
Huang et al., Vector Boosting for Rotation Invariant Multi-View Face Detection, ICCV2005, vol. 1, Oct. 17-21, 2005, pp. 446-453.

* cited by examiner

*Primary Examiner* — Charlotte M Baker
(74) *Attorney, Agent, or Firm* — Amin, Turocy & Watson LLP; Gregory Turocy

(57) ABSTRACT

According to an embodiment, a pattern classifier device includes a decision unit, an execution unit, a calculator, and a determination unit. The decision unit is configured to decide a subclass to which the input pattern is to belong, based on attribute information of the input pattern. The execution unit is configured to determine whether the input pattern belongs to a class that is divided into subclasses, using a weak classifier allocated to the decided subclass, and output a result of the determination and a reliability of the weak classifier. The calculator is configured to calculate an integrated value obtained by integrating an evaluation value based on the determination result and the reliability. The determination unit is configured to repeat the determination processing when a termination condition of the determination processing is not satisfied, and terminate the determination processing and output the integrated value when the termination condition, has been satisfied.

7 Claims, 7 Drawing Sheets

US 9,330,662 B2

PATTERN CLASSIFIER DEVICE, PATTERN CLASSIFYING METHOD, COMPUTER PROGRAM PRODUCT, LEARNING DEVICE, AND LEARNING METHOD

CROSS-REFERENCE TO RELATED APPLICATION

This application is based upon and claims the benefit of priority from Japanese Patent Application No. 2013-045895, filed on Mar. 7, 2013; the entire contents of which are incorporated herein by reference.

FIELD

Embodiments described herein relate generally to a pattern classifier device, a pattern classifying method, a computer program product, a learning device, and a learning method.

BACKGROUND

In pattern classifier devices, an algorithm of AdaBoost is known in which a cascade connection of a plurality of weak classifiers forms a single classifier. Hereinafter, a connection of a plurality of weak classifiers will be defined as a single classifier (also referred to as strong classifier). AdaBoost is often used as an effective approach for determining a face region in an image. In AdaBoost, it is necessary to separately prepare, in advance, subclass classifiers for the front direction, the left direction, and the right direction in order to response to changes according to subclasses for the front direction, the left direction, and the right direction, for example, and to apply all the subclass classifiers to an input pattern.

The conventional technique, however, is disadvantageous in that since a single subclass decided first is used to execute subsequent determination processing, the performance depends to a large extent on a first decision rule, and that the accuracy of determination processing is reduced if the rule is not appropriately designed.

DETAILED DESCRIPTION

According to an embodiment, a pattern classifier device for determining whether an input pattern belongs to a class that is divided into a plurality of subclasses includes a reception unit, a decision unit, an execution unit, a calculator, and a determination unit. The reception unit is configured to receive the input pattern and attribute information of the input pattern. The decision unit is configured to decide the subclass to which the input pattern is to belong, based on at least the attribute information. The execution unit is configured to determine whether the input pattern belongs to the class, using a weak classifier allocated to the decided subclass, and output a result of the determination and a reliability of the weak classifier. The calculator is configured to calculate an integrated value obtained by integrating an evaluation value based on the result of the determination and the reliability. The determination unit is configured to determine whether a termination condition of determination processing performed by the decision unit, the execution unit, and the calculator, has been satisfied, repeat the determination processing when the termination condition has not been satisfied, and terminate the determination processing and output the integrated value at the time of the termination when the termination condition has been satisfied.

Preferred embodiments of a pattern classifier device according to the present invention will be described in detail with reference to accompanying drawings.

First Embodiment

Disadvantages of the existing technique will be further described. As a method which applies AdaBoost, a method is known that determines a face region with a high precision by extracting the face region with a coarse classifier first, and then performing determination with a classifier that has learned for the front direction, the left direction, and the right direction. This method, however, is applied to a subclass inferred from an input pattern and is not used for a case where an input pattern and a subclass attribute are provided together in advance.

Figure 1:
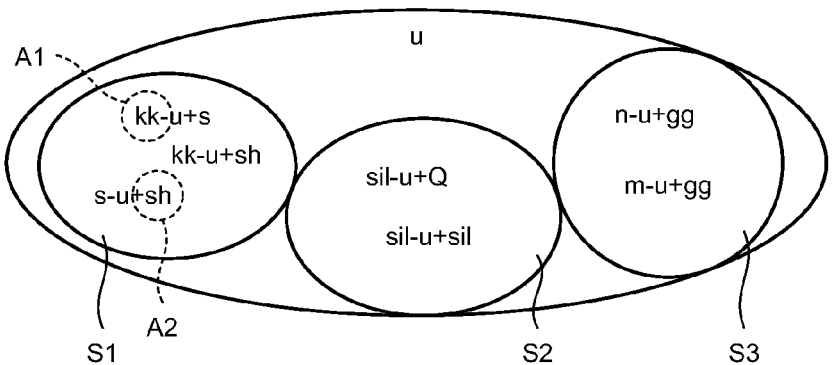
FIG. 1 illustrates an example in which subclasses are considered in determining a phoneme.

FIG. 1 illustrates an example in which subclasses are considered in determining a phoneme in sound recognition. In the phoneme determination, the feature of a phoneme changes according to phoneme contexts before and after the phoneme as shown in FIG. 1. Hence, a phoneme context is regarded as a subclass to be considered in the determination.

FIG. 1 illustrates an example in which a phoneme "u" has been input as an input pattern. The feature of "u" differs according to phonemes before and after the phoneme "u" (phoneme contexts) between when a phoneme row "kkusa" for the Japanese sound meaning "grass" has been input and when a phoneme row "mugai" for the Japanese sound meaning "harmless" has been input. A class indicating that the phoneme belongs to "u" is thus divided into subclasses S1, S2, and S3. Note that FIG. 1 illustrates only one example of a class and subclasses derived from the class and the present invention is not limited to this example.

A phoneme as a determination target (in FIG. 1, "u") is classified into one of subclasses according to a phoneme context. A phoneme context will be hereinafter also referred to as a subclass attribute (attribute information) of a phoneme. In FIG. 1, if the determination target has a subclass attribute A1 indicating that the phoneme before the determination target is "kk" and has a subclass attribute A2 indicating that the phoneme after the determination target is "sh", the input pattern (phoneme "u") is classified into a subclass S1.

Figure 2:
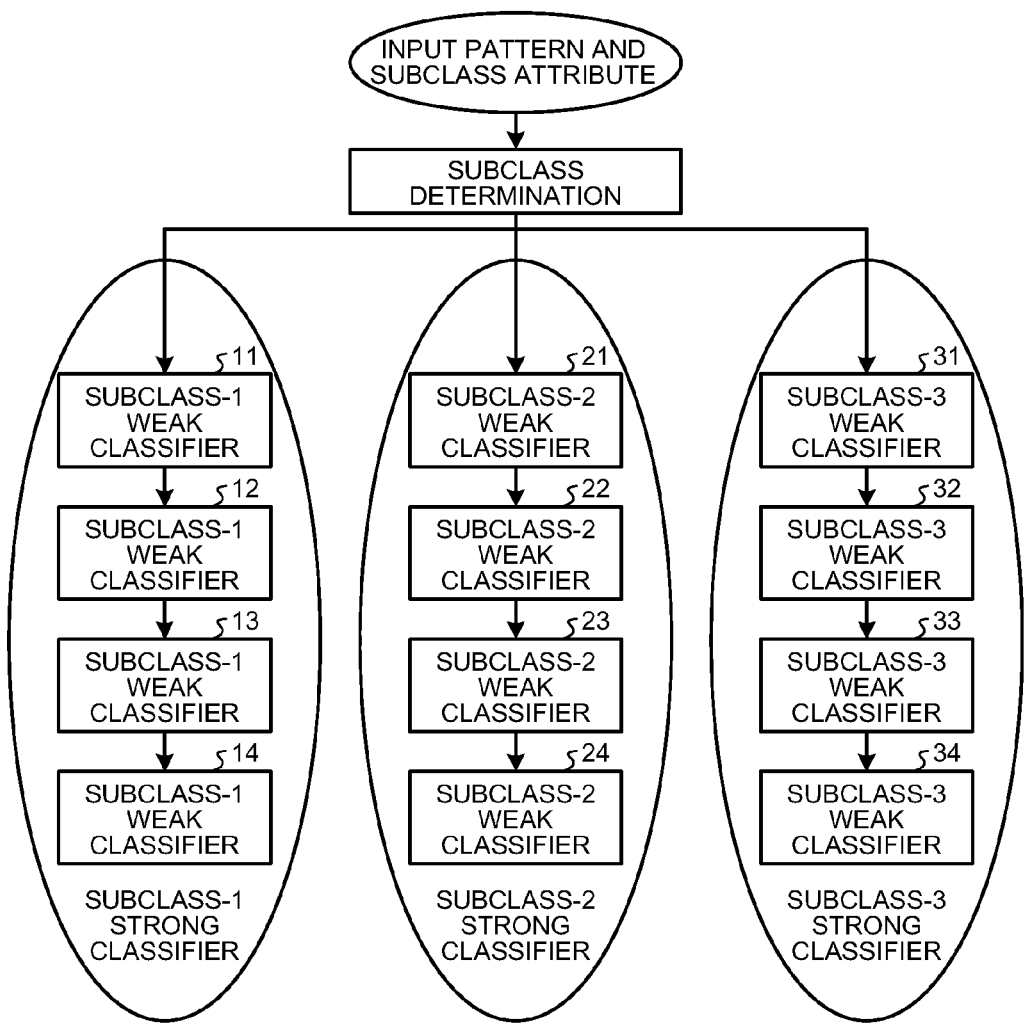
FIG. 2 illustrates determination processing in a case where an existing technique is applied.

In a sound recognition system, a phoneme context is, in many cases, given at recognition as known information together with an input pattern. Determination processing will be described with reference to FIG. 2 on an assumption that an input pattern is classified into a subclass according to phoneme contexts before and after the input pattern and an algorithm such as AdaBoost is applied. FIG. 2 illustrates an example of determination processing in which a conventional method is applied. When AdaBoost is applied, a phoneme context is clustered beforehand in some way to decided subclasses, and then classifiers are independently learned for the respective subclasses. At recognition, a subclass to which an input pattern is to belong is decided from associated phoneme contexts, and a classifier correlated with the decided subclass is applied.

Specifically, when it is decided that the input pattern belongs to a subclass 1, a subclass-1 strong classifier including subclass-1 weak classifiers 11 to 14 is used for subsequent determination processing. Likewise, when it is decided that the input pattern belongs to a subclass 2, a subclass-2 strong classifier including subclass-2 weak classifiers 21 to 24 is used for subsequent determination processing. Further, when it is decided that the input pattern belongs to a subclass 3, a subclass-3 strong classifier including subclass-3 weak classifiers 31 to 34 is used for subsequent determination processing. Note that the number of weak classification steps is not limited to four.

As described above, in the existing method, using subclass attributes associated with an input pattern necessitates preparation of respective classifiers for the subclasses. Further, a single classifier (strong classifier) cannot perform classifying in consideration of subclass attributes.

A pattern classifier device according to a first embodiment performs classifying through cascade-connection of a plurality of weak classifiers. Each of the weak classifiers has a subclass group and classifiers respectively allocated to the subclasses. The pattern classifier device according to the present embodiment decides which subclass an input pattern is to be classified into based on subclass attributes associated with the input pattern, and uses a weak classifier allocated to the decided subclass.

Figure 3:
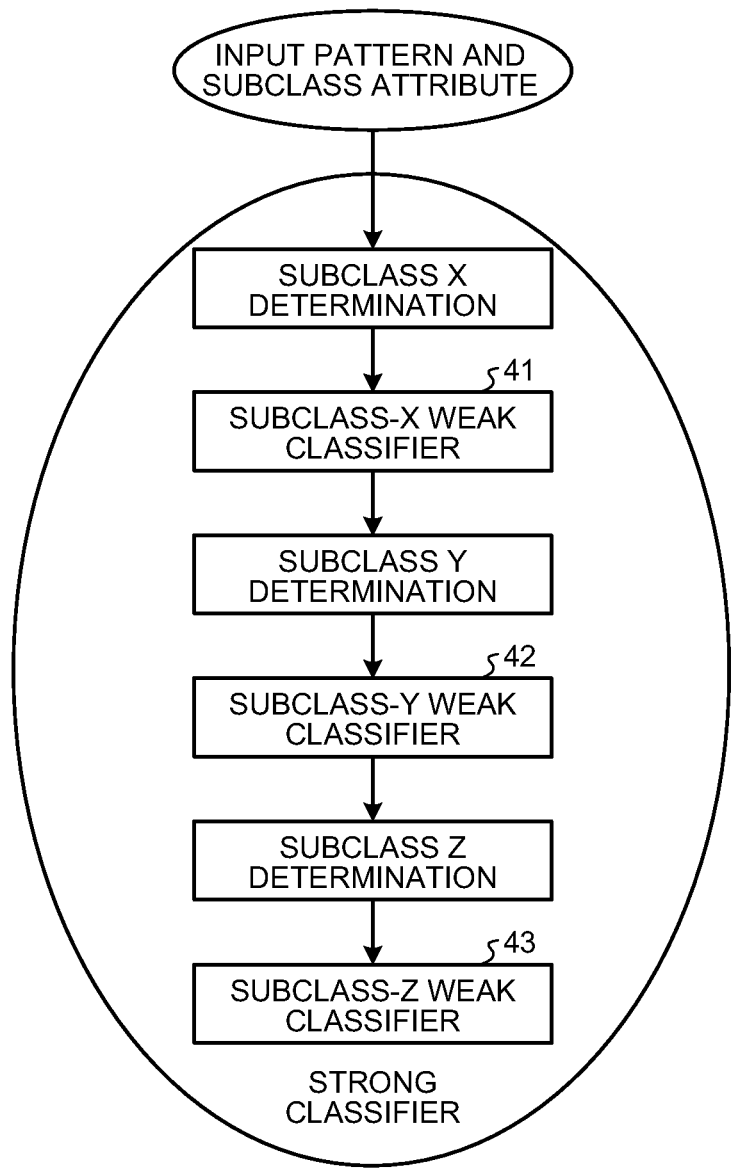
FIG. 3 illustrates determination processing according to embodiments.

FIG. 3 illustrates an example of classifying processing according to the present embodiment. As shown in FIG. 3, in the embodiment, a subclass is decided from the attribute thereof for each plural weak classification steps. Herein, subclasses X, Y, and Z are decided in three steps, respectively. Note that the number of steps is not limited to three. After the subclasses X, Y, and Z are decided, a subclass-X weak classifier 41, a subclass-Y weak classifier 42, and a subclass-Z weak classifier 43 for the subclasses X, Y, and Z, respectively are used. This makes it possible for a single classifier (strong classifier) alone formed of weak classifiers connected together to perform classifying with a high precision in consideration of subclass attributes.

Next, an example will be described in which the pattern classifier device according to the first embodiment is applied to a sound recognition device 100. Note that the pattern classifier device according to the first embodiment may be applied not only to a sound recognition device but also any existing devices, including for example an image recognition device, as long as the existing devices are provided with a pattern classifying function.

Figure 4:
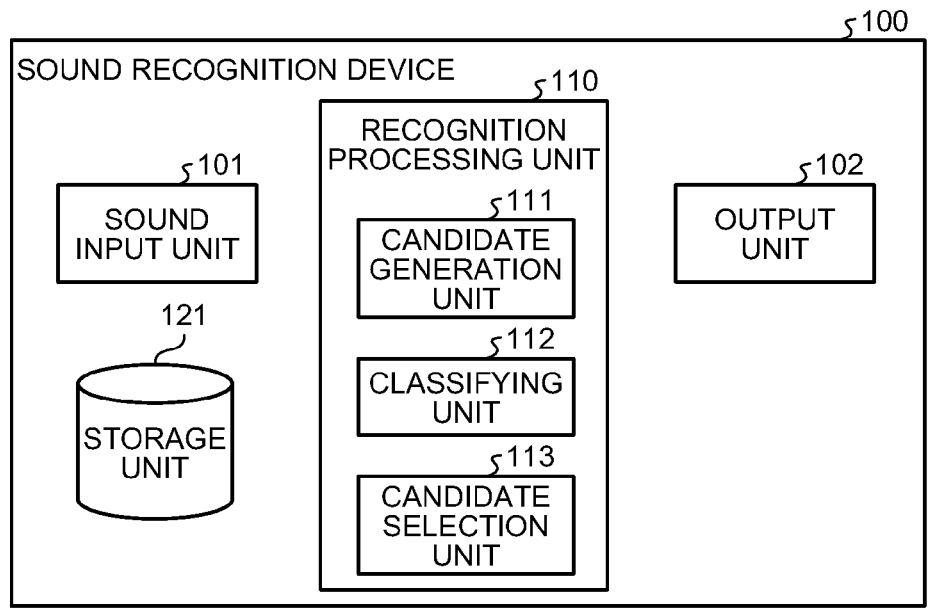
FIG. 4 is a block diagram illustrating a sound recognition device according to a first embodiment.

FIG. 4 is a block diagram illustrating an example of a functional configuration of the sound recognition device 100 in the first embodiment. The sound recognition device 100 includes a sound input unit 101, a recognition processing unit 110, an output unit 102, and a storage unit 121.

The storage unit 121 stores various types of information to be referred to in sound recognition processing. The storage unit 121 stores a phoneme dictionary and a word dictionary, for example. The storage unit 121 can be formed of various types of general storage mediums including a HDD (hard disk drive), an optical disk, a memory card, and a RAM (random access memory).

The sound input unit 101 inputs a sound as a recognition target. More specifically, the sound input unit 101 inputs a sound signal from a sound input microphone, for example.

The recognition processing unit 110 executes sound recognition processing to the input sound. The recognition processing unit 110 includes a candidate generation unit 111, a classifying unit 112, and a candidate selection unit 113.

The candidate generation unit 111 receives the input sound (sound signal) and executes sound recognition processing to generate a recognition candidate, which is a candidate for a recognition result. More specifically, the candidate generation unit 111 generates a likely phoneme row candidate group for the input sound, using a phoneme dictionary or a word dictionary. The candidate generation processing by the candidate generation unit 111 can be achieved in the same method as the HMM method conventionally used for sound recognition processing.

The classifying unit 112 is a component corresponding to the pattern classifier device. The classifying unit 112 determines whether or not phonemes contained in the generated phoneme raw candidates belong to a specified class. The classifying unit 112 will be described in detail later.

The candidate selection unit 113 selects one candidate from the phoneme row candidates based on a result of the classifying by the classifying unit 112. The output unit 102 outputs the selected candidate as a result of the sound recognition.

Figure 5:
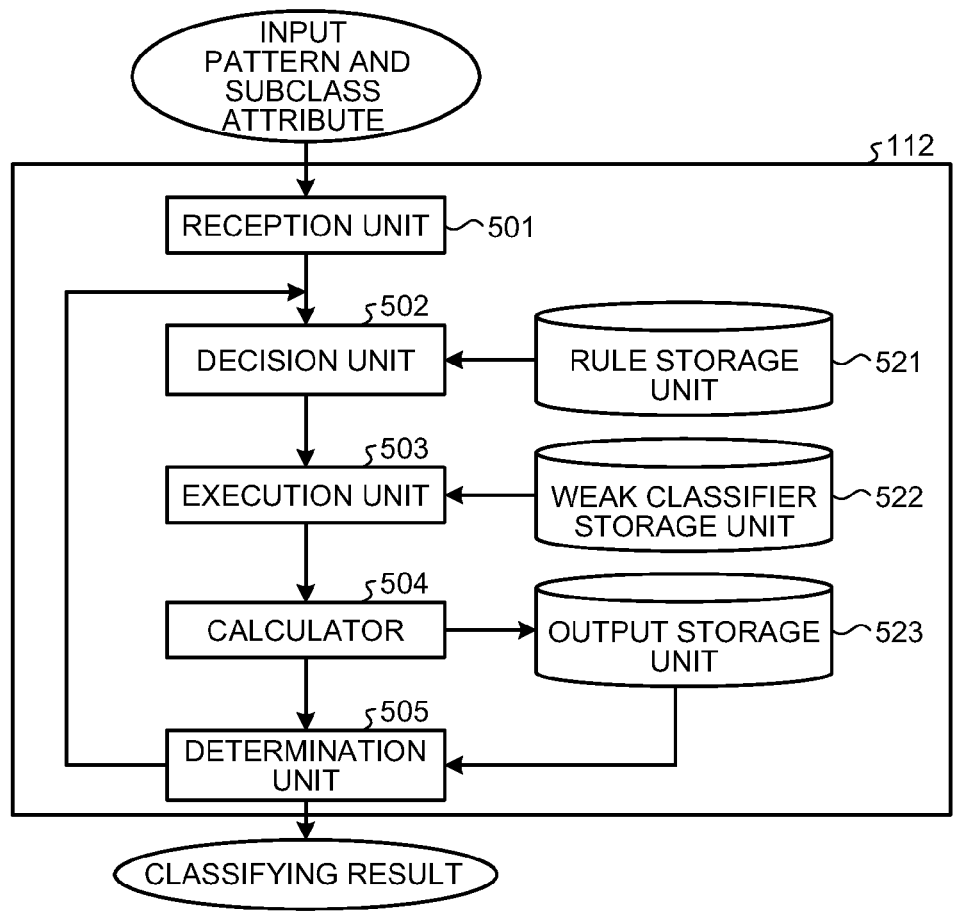
FIG. 5 is a block diagram illustrating the details of a decision unit.

FIG. 5 is a block diagram illustrating an example of a detailed functional configuration of the classifying unit 112. The classifying unit 112 includes a rule storage unit 521, a weak classifier storage unit 522, an output storage unit 523, a reception unit 501, a decision unit 502, an execution unit 503, a calculator 504, and a determination unit 505.

The reception unit 501, the decision unit 502, the execution unit 503, the calculator 504, and the determination unit 505 may be realized by allowing a processor such as a CPU (central processing unit) to execute a program, in other word, by software, or by hardware such as an IC (integrated circuit), or by a combination of software and hardware.

The rule storage unit 521 stores a rule for deciding a subclass. The subclass decision rule is a rule for deciding which one of subclasses is to contain an input pattern according to a subclass attribute. For instance, the subclass decision rule may be a rule for classifying an input pattern into two subclasses according to whether or not the phoneme before the input pattern is "u". The subclass decision rule may be set for each classifying processing (weak classification step) using a weak classifier.

The weak classifier storage unit 522 stores a weak classifier obtained by prior learning, for example, and the reliability of the weak classifier. The weak classifier is stored in the weak classifier storage unit 522 in correlation with a subclass.

The output storage unit 523 stores a result of output of the calculator 504.

The rule storage unit 521, the weak classifier storage unit 522, and part of or entire of the output storage unit 523 may be realized by the storage unit 121 shown in FIG. 4.

The reception unit 501 receives the input pattern (phoneme) and attribute information (subclass attribute) of the input pattern, which are input from the candidate generation unit 111, for example.

The decision unit 502 decides a subclass of the input pattern based on subclass attributes associated with the input pattern. The decision unit 502 decides a subclass of the input pattern using, for example, the subclass decision rule and the subclass attribute stored in the rule storage unit 521.

The execution unit 503 determines whether or not the input pattern belongs to a class using a weak classifier allocated to the decided subclass, and outputs a result of the determination (weak classification result) and the reliability of the weak classifier. More specifically, the execution unit 503 reads from the weak classifier storage unit 522 the weak classifier correlated with the decided subclass and the reliability of the classifier. The execution unit 503 executes classifying to the input pattern using the read weak classifier and outputs a result of the weak classification and the reliability of the read weak classifier.

The calculator 504 calculates an integrated value (score) obtained by integrating an evaluation value based on the weak classification result and the reliability. The integrated value is stored in, for example, the output storage unit 523.

The determination unit 505 determines whether or not a termination condition of the classifying processing has been satisfied, and continues the classifying processing in a case where the condition has not been satisfied. In the classifying processing, the decision unit 502, the execution unit 503, and the calculator 504 repeat the above processing. In a case where the termination condition has been satisfied, the determination unit 505 terminates the classifying processing and outputs an integrated value (a result of output stored in the output storage unit 523) at the time of the termination.

Figure 6:
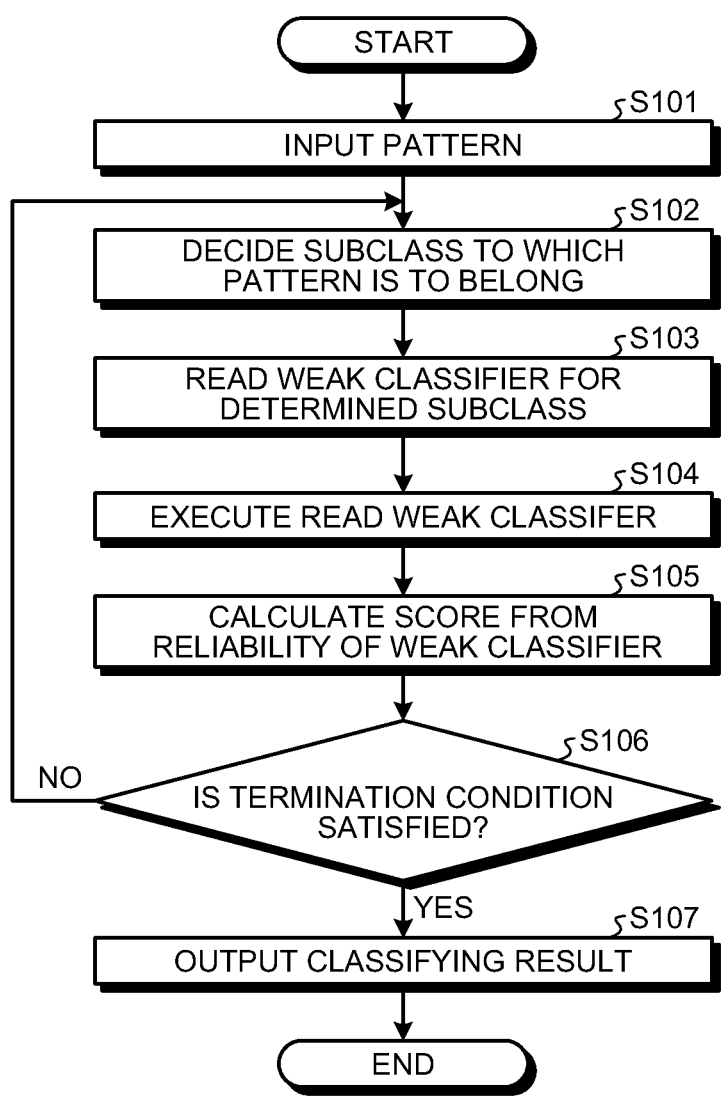
FIG. 6 is a flowchart illustrating determination processing according to the first embodiment.

Next, the classifying processing by the thus configured sound recognition device 100 will be described with reference to FIG. 6. FIG. 6 is a flowchart illustrating an example of the classifying processing in the first embodiment.

Hereinafter, an MFCC (mel frequency cepstral coefficient) of 12 dimensions as a general sound feature amount obtained from a sound waveform is used as the input pattern. Further, the phoneme contexts before and after the input pattern are used as subclass attributes. For instance, there are five phonemes of "a", "i", "u", "e", and "o". When phoneme determination is to be performed for determining whether or not the phoneme "e" in the word "uea" is "e", a context before "e" is "u" and a context after "e" is "a".

The input pattern and the subclass attributes are not limited to the above. An input pattern extracted in any method may be used and any subclass attributes may be employed as long as the input pattern can be classified into any subclass based on the subclass attributes.

As a classification example, a two-class case will be described in which it is determined whether or not an input pattern is a phoneme "a". The subclass attributes of the input pattern "a" are that a context before the input pattern is "u" and a context after the input pattern is "o". Note that the number of classes is not limited to two in the classification according to the present embodiment, and the embodiment is applicable to a classification using a large number of classes.

The reception unit 501 receives input of an input pattern and subclass attributes of the input pattern (step S101). For example, the unit 501 receives an input pattern "a", and subclass attributes "u" (preceding context) and "o" (subsequent context).

The decision unit 502 applies a subclass decision rule for the $N^{th}$ weak classification steps (N>0) to the received subclass attributes (the preceding context is "u" and the subsequent context is "o") in each of the steps. As the subclass decision rule, a rule is applicable that determines whether or not the preceding context is a phoneme p (p 532{"a", "i", "u", "e", and "o"}) and the subsequent context is the phoneme p. Note that the subclass decision rule is not limited to the above and any rule is applicable according to which an input pattern can be classified into a subclass using a subclass attribute. Further, an input pattern may be classified into a subclass using a subclass attribute and the value of the input pattern. For instance, if an input pattern is a feature amount vector, a rule may be used describing, for example, that a first component of the feature amount vector is a threshold value (five, for example) or smaller and a subclass attribute (preceding context) is "a".

If the subclass decision rule correlated with the $N^{th}$ weak classification steps is a rule according to which there are two subclasses where the preceding phoneme context is "u" and is not "u", the input pattern "a" is classified (determined) into a subclass where the preceding phoneme context is "u" since the phoneme context before the input pattern is "u" (Step S102).

The execution unit 503 reads a weak classifier correlated with the decided subclass (the subclass where the preceding phoneme context is "u") from the weak classifier storage unit 522 (Step S103). The execution unit 503 executes classifying processing using the read weak classifier (Step S104). The execution unit 503 outputs a result of the classifying processing (weak classification result) and the reliability of the weak classifier. In the classifying processing using the weak classifier, it is determined whether or not an MFCC of a predetermined number of dimensions is larger than a threshold value determined in advance.

This operation is the same as a method generally called decision stump. If an input pattern is represented by x, a weak classifier correlated with the subclass for "u" is represented by $h_{N0}(x)$, and a weak classifier correlated with the subclass for not "u" is represented by $h_{N1}(x)$ in the $N^{th}$ weak classification steps, the weak classifier $h_{N0}(x)$ operates as indicated by an expression (1) below in a case where the input pattern is determined to be "a" when an MFCC of a first dimension (MFCC(1)) is larger than a threshold value of 30.

if MFCC(1)≤30

$h_{N0}(x)=-1$ else $h_{N0}(x)=1$ (1)

The calculator 504 calculates a score using the result of the weak classification and the reliability of the weak classifier obtained by the execution unit 503 (Step S105). The calculator 504 integrates a score and stores the integrated score in the output storage unit 523. A score $S_N$ is calculated using a reliability $\alpha_{N0}$ (N>0) correlated with the weak classifier in advance by the following expression (2) below.

$S_N = \alpha_{N0} h_{N0}(x)$ (2)

The calculator 504 obtains an integrated score $T_{sN}$, which is an integrated value obtained by integrating a score $S_N$ N times, by the expression (3) below:

$T_{sN} = T_{sN-1} + S_N$ (3)

The determination unit 505 determines whether or not a termination condition of the classifying processing is satisfied (Step S106). Specifically, the unit 505 determines whether or not N has reached a predetermined number. If the termination condition is not satisfied (Step S106: No), the processing goes back to Step S102 and the subsequent weak classification step is repeated. When the termination condition is satisfied (Step S106: Yes), the determination unit 505 outputs the integrated score (classifying result) stored in the output storage unit 523 and terminates the classifying processing (Step S107).

In the above example, when the integrated score $T_{sN}$ is larger than zero, the input pattern is determined to be "a". On the other hand, when the integrated score $T_{sN}$ is not larger than zero, the input pattern is determined not to be "a".

The above description has been made of the weak classifier and the score calculation method to which the same method as AdaBoost in accordance with a basic decision stump is applied. An applicable method is not limited to the above and may include Boosting techniques of a developed version of AdaBoost, such as Real-AdaBoost and Gentle Boost. Further, as the weak classifier, there may be applied a method which considers the co-occurrence property of an input pattern, such as CoHOG (Co-occurrence Histograms of Oriented Gradients). Moreover, not all of the weak classification steps need to consider subclasses and part of the steps may be conventional steps, which do not consider subclasses (conventional AdaBoost).

Since the pattern classifier device according to the first embodiment uses a classifier which considers subclasses for each weak classifier, a single classifier alone achieves more precise classifying using subclasses.

Second Embodiment

Figure 7:
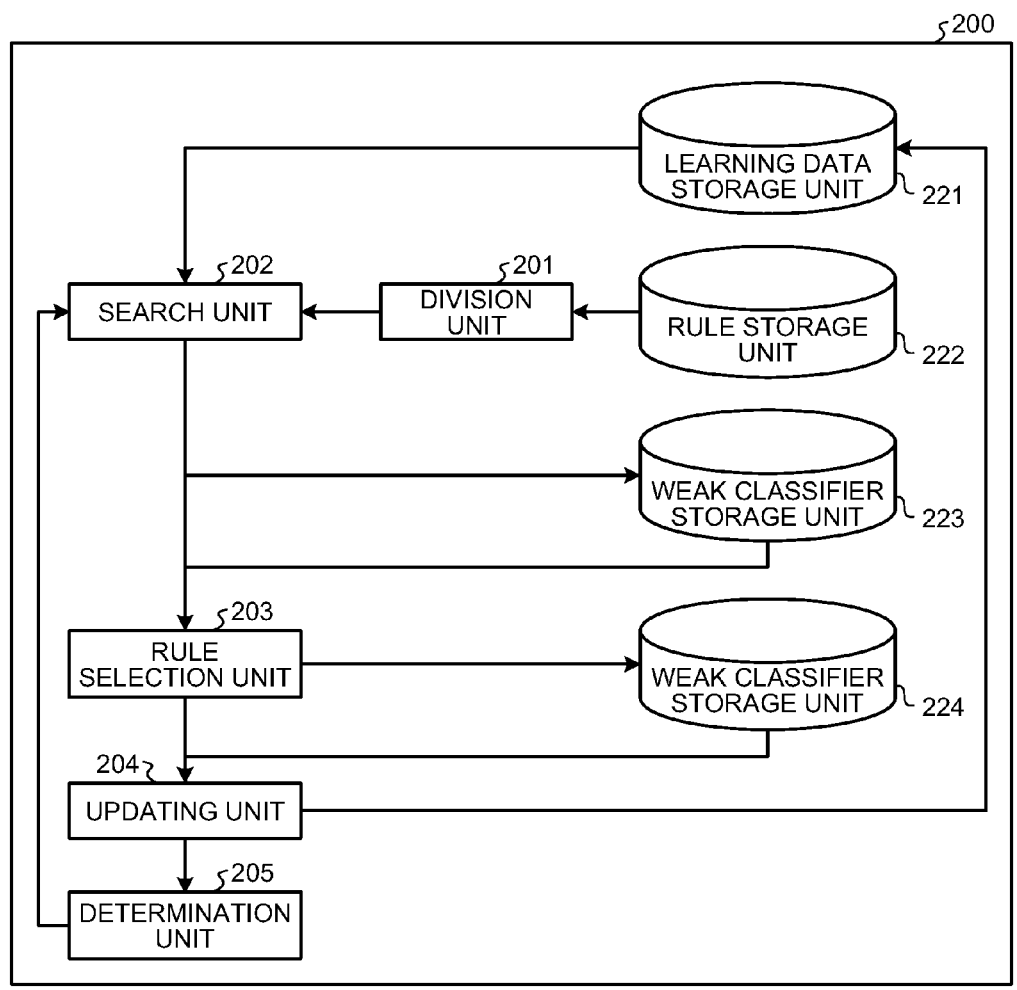
FIG. 7 is a block diagram illustrating a learning device according to a second embodiment.

In a second embodiment, a learning device that learns the classifier used in the pattern classifier device according to the first embodiment will be described. FIG. 7 is a block diagram illustrating an example of a functional configuration of a learning device 200 according to the second embodiment. The learning device 200 includes a learning data storage unit 221, a rule storage unit 222, weak classifier storage units 223 and 224, a division unit 201, a search unit 202, a rule selection unit 203, an updating unit 204, and a determination unit 205.

The learning data storage unit 221 stores learning data containing a class label, an input pattern, a subclass attribute, and a weight. The rule storage unit 222 stores a division rule according to which the learning data is divided into plural pieces of learning data (hereinafter referred to as subclass data) according to which one of subclasses the learning data belongs to. Specifically, the division rule is a rule for dividing the learning data into two pieces of subclass data according to, for example, whether or not a preceding phoneme context is "u" or whether or not a subsequent phoneme context is "i". The division rule is not limited to the above and any rule is applicable as long as the learning data can be divided into plural pieces of subclass data according to the rule. Further, a rule may be used according to which the learning data is divided into plural pieces of subclass data based on subclass attributes and the value of an input pattern.

The weak classifier storage unit 223 stores a division rule calculated in the search unit 202 and a weak classifier searched for in the search unit 202. The weak classifier storage unit 224 stores a weak classifier according to a division rule selected by the rule selection unit 203.

The division unit 201 divides the learning data stored in the learning data storage unit 221 into subclass data according to the division rule stored in the rule storage unit 222.

The search unit 202 searches, for each of the pieces of subclass data obtained by the division, a plurality of weak classifiers for a weak classifier with a high degree of compatibility with the subclass data.

The rule selection unit 203 calculates the reliabilities of the weak classifiers searched for and selects a division rule for a weak classifier with a high reliability from a plurality of division rules. Specifically, the rule selection unit 203 selects a division rule with the highest reliability from the division rules stored in the weak classifier storage unit 223. The rule selection unit 203 stores the selected division rule, the weak classifier associated with the selected division rule, and the reliability in the weak classifier storage unit 224.

The updating unit 204 updates the weight of the learning data, using the division rule stored in the weak classifier storage unit 224, the weak classifier associated with the division rule, and the reliability.

The determination unit 205 determines whether or not the search of a weak classifier is to be terminated.

The division unit 201, the search unit 202, the rule selection unit 203, the updating unit 204, and the determination unit 205 may be realized by allowing a processor such as a CPU (central processing unit) to execute a program, in other word, by software, or by hardware such as an IC (integrated circuit), or by a combination of software and hardware.

Figure 8:
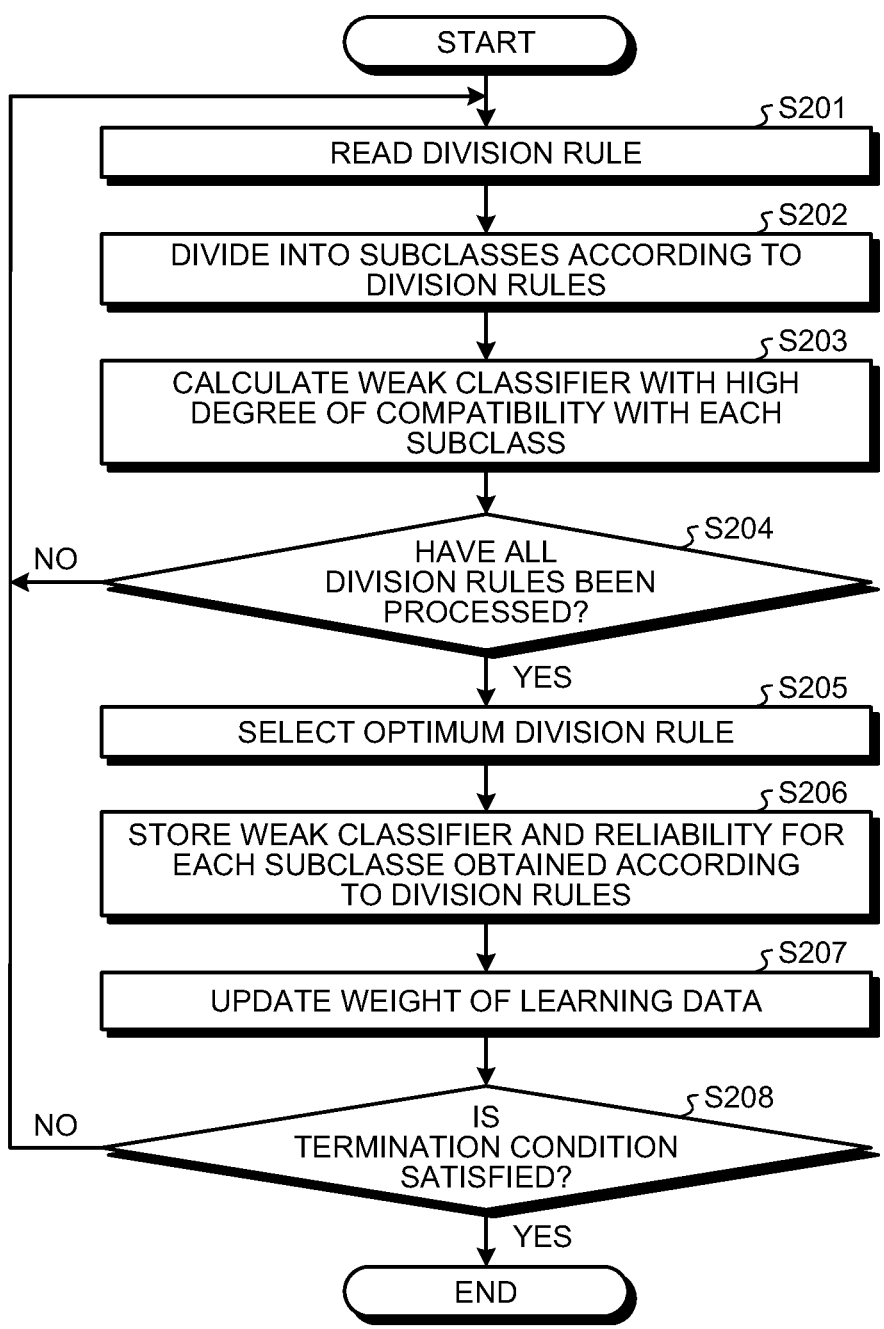
FIG. 8 is a flowchart illustrating learning processing according to the second embodiment.

Subsequently, the learning processing by the thus configured learning device 200 will be described with reference to FIG. 8. FIG. 8 is a flowchart illustrating an example of the learning processing according to the second embodiment.

In the second embodiment, an input pattern (learning data) stored in the learning data storage unit 221 has a sound feature amount MFCC of 12 dimensions obtained from a sound waveform, as in the first embodiment. Further, phoneme contexts before and after the input pattern are used as subclass attributes. The input pattern and the subclass attributes in the second embodiment are not limited to the above, as in the first embodiment. An input pattern extracted in any method may be used and any subclass attributes may be employed as long as the input pattern can be classified into any subclass based on the subclass attributes.

An example will be hereinafter described in which a two-class classifier is learned that determines whether or not an input pattern is a phoneme "a". Note that the number of classes is not limited to two in the classification according to the present embodiment and the embodiment is applicable to a classification using a large number of classes.

The learning data storage unit 221 stores a plurality of pieces of learning data. Each piece of the learning data is vector data of a 12-dimensional MFCC having a class label indicating "a" or "not a" and having, as subclass attributes, phoneme contexts before and after the data (for example, the phoneme contexts before and after the data are "u" and "i", respectively). Further, each learning data has a weight coefficient. The respective weight coefficients of the pieces of data at the $N^{th}$ time are determined by the updating unit 204 in the $(N-1)^{th}$ learning processing.

When N is 1, the weight of the learning data having a class label of "a" is a value (initial data weight) obtained by dividing, by two, the reciprocal of the total number of the learning data having a class label of "a". Further, the weight of the learning data having a class label of "not a" is a value obtained by dividing, by two, the reciprocal of the total number of the learning data having a class label of "not a".

Note that the initial value (initial data weight) of the weight is not limited to the above and may be changed on purpose by significantly weighting, in advance, data to be highlighted, for example.

In each of the $N^{th}$ (N>0) weak classifier learning steps, the division unit 201 extracts one of the division rules from the rule storage unit 222 (Step S201). Examples will be described below in which division rules of whether or not the preceding phoneme context is "u", whether or not a subsequent phoneme context is "e", and whether or not the preceding phoneme context is "a" are used.

The division unit 201 divides the learning data into plural pieces of subclass data according to the extracted division rule (for example, a division rule d of whether or not the preceding phoneme context is "u") (Step S202). The learning data is divided into two pieces of subclass data in a two-class classification.

The search unit 202 calculates a weak classifier with a high degree of compatibility with each piece of the subclass data obtained according to the division rule d (Step S203). A method of calculating a weak classifier for each subclass data is nearly the same as the method of calculating a weak classifier in conventional AdaBoost. A learning method of conventional AdaBoost will be hereinafter described.

If there are N number of pieces of learning data (x1, y1), . . . , (xi, yi), . . . , and (xN, yN) where 1≤i≤N, xi denotes data having a certain feature, and yi $\subseteq$ (1, −1) denotes a class label to which xi belongs, a target object to be detected by AdaBoost generally has a class label of 1 and the others have a class label of −1. Under the above condition, learning processing using AdaBoost is executed by the following steps A1 to A2.

Step A1: The weight Do (i) of learning data is initialized by the following expression (4).

$$D_0(i) = \begin{cases} \dfrac{1}{2 \sum_{y_1=1} 1}, & y_i = 1 \\ \dfrac{1}{2 \sum_{y_i=-1} 1}, & y_i = -1 \end{cases} \quad (4)$$

Step A2: A weak classifier $h_t(x)$ is learned so that an error rate $\epsilon_t$ (the following expression (5)) to the learning data becomes minimum in a weight distribution Dt of the $t^{th}$ learning data in consideration of the weight.

$$\epsilon_t = \Sigma_{i:y_i \neq h_t} D_t(i) \quad (5)$$

Step A3: The reliability $\alpha_t$ is calculated from $\epsilon_t$ (the following expression (6)).

$$\alpha_t = \frac{1}{2} \log\left(\frac{1-\epsilon_t}{\epsilon_t}\right) \quad (6)$$

Step A4: The weight of the learning data is updated (the following expression (7)).

$$\hat{D}_{t+1}(i) = D_t(i)\exp(-\alpha_t y_i h_t(x_i)) \quad (7)$$

Step S5: Normalization processing is performed so that the weight of the learning data becomes one (the following expression (8)).

$$D_{t+1}(i) = \frac{\hat{D}_{t+1}(i)}{Z_{t+1}} \quad (8)$$

$$\left(Z_{t+1} = \sum_{i=1}^{N} \hat{D}_{t+1}(i)\right)$$

Steps A2 to A5 are performed T times and T number of weak classifiers and reliabilities are obtained. A last strong classifier H(x) is a weighted sum having, as a weight, the reliabilities of the T number of selected weak classifiers (the following expression (9)).

$$H(x) = \text{sign}\left(\sum_{t=1}^{T} \alpha_t h_t(x)\right) \quad (9)$$

In this way, a classifying function is obtained for classifying the input x as a detection target if H(x) is larger than zero and classifying the input x as a non-detection target if H(x) is not larger than zero.

In the conventional AdaBoost, a weak classifier $h_N(x)$ is, as described above, learned so that the error rate $\epsilon_n$ (the expression (5)) becomes minimum in the $N^{th}$ learning data weight distribution $D_N$ in consideration of the weight. In the present embodiment, weak classifiers $h_{Nd0}(X)$ and $h_{Xd1}(x)$ are obtained so that error rates $\epsilon_{Nd0}$ and $\epsilon_{Nd1}$ becomes minimum for the subclass weight distributions $D_{Nd0}$ and $D_{Nd1}$ (subclass data), respectively, obtained by dividing the learning weight distribution (learning data) according to the division rule d (such as whether or not the preceding phoneme context is "u").

An optimum weak classifier can be obtained in the same method as a decision stump. More specifically, an optimum weak classifier can be obtained in such a manner that an MFCC of 12 dimensions is sequentially searched for a dimension and a threshold value at which a rate of the class determination ("a" or "not a") is the highest.

As for threshold values, an optimum threshold value is obtained by entirely searching the values of the learning data stored in the learning data storage unit 221. The search unit 202 correlates a calculated weak classifier (for example, an optimum dimension, an optimum threshold value, and information indicating which one of values smaller and larger than the threshold value is classified as "a") with the division rule d in the $N^{th}$ weak classifier learning steps and stores the weak classifier in the weak classifier storage unit 223.

There is thus obtained an optimum weak classifier for subclasses (subclass data) decided according to each division rule.

The search unit 202 determines whether or not all of the division rules have been processed (Step S204). If all of the division rules have not been processed (Step S204: No), the division unit 201 reads a next division rule and repeats the processing. Note that searching for all of the division rules is not necessarily regarded as a condition for termination of searching by the search unit 202 and the searching may be terminated according to the compatibility of a weak classifier with each subclass data, for example.

If all of the division rules have been processed (Step S204: Yes), the rule selection unit 203 selects an optimum division rule from the weak classifier storage unit 223 (Step S205). The weak classifier storage unit 223 stores a weak classifier of each subclass correlated with all of the division rules in the $N^{th}$ weak classifier learning steps. The rule selection unit 203 applies the weak classifiers to the respective pieces of subclass data and selects a division rule so that the error rate $\epsilon_N$ (expression (5)) becomes minimum in the entire leaning data weight distribution $D_N$.

The rule selection unit 203 stores the selected division rule and the reliability $\alpha_N$ in the weak classifier storage unit 224 (Step S206). The reliability $\alpha_N$ is obtained from the expression (6) using a weak classifier correlated with the selected division rule and the error rate $\epsilon_N$. Subsequently, the rule selection unit 203 deletes the data stored in the weak classifier storage unit 223.

Note that the reliability stored in the weak classifier storage unit 224 is not limited to the reliability $\alpha_N$ alone obtained from the error rate $\epsilon_N$ in the entire learning data weight distribution $D_N$ and two or more reliabilities, such as the reliabilities $\alpha_{Nd0}$ and $\alpha_{Nd1}$ obtained by the expression (6) from the error rates $\epsilon_{Nd0}$ and $\epsilon_{Nd1}$ for the subclass weight distributions $D_{Nd0}$ and $D_{Nd1}$, respectively, may be used.

Further, the updating unit 204 calculates a weight (weight coefficient) with respect to the learning data based on the division rule stored in the weak classifier storage unit 224, the weak classifier correlated with the division rule, and the reliability. The updating unit 204 updates a weight coefficient of the learning data stored in the learning data storage unit 221 with the calculated weight coefficient (Step S207). The updating unit 204 determines a learning data weight distribution $D_{N+1}$ by the expressions (7) and (8) using the weak classifier and the reliability $\alpha_N$ stored in the weak classifier storage unit 224 and the class labels stored in the learning data storage unit 221, for example.

The determination unit 205 determines whether or not the termination condition is satisfied (Step S208). More specifically, the determination unit 205 sets termination of a predetermined number of weak classifier learning steps as a termination condition. If the termination condition is not satisfied (Step S208: No), the processing is repeated from Step S201. If the termination condition is satisfied (Step S208: Yes), the learning processing is terminated.

The above learning processing enables learning a classifier which considers subclasses. Although the present embodiment has described the weak classifier learning with AdaBoost using a basic decision stump, an applicable method is not limited to the above method and may include Boosting techniques of a developed version of AdaBoost, such as Real-AdaBoost and Gentle Boost. Further, as the weak classifier, there may be applied a method which considers the co-occurrence property of an input pattern (e.g. co-occurrence histograms of oriented gradients). Moreover, not all of the weak learning steps need to consider subclasses, and may include existing learning steps which do not consider subclasses (general AdaBoost).

As described above, more precise classification is enabled using subclasses according to the first and the second embodiments.

Figure 9:
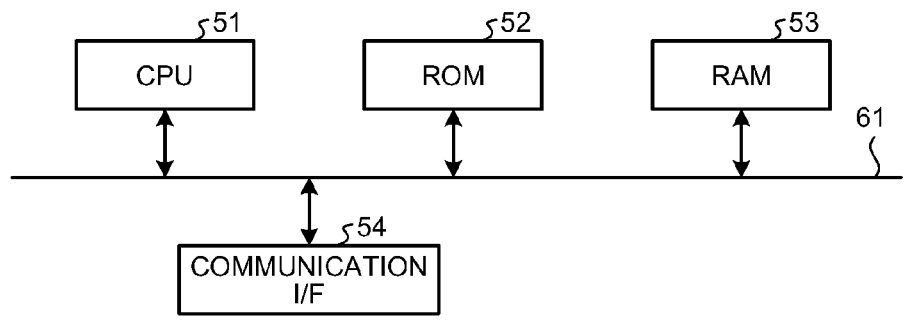
FIG. 9 is a hardware configuration diagram of the device according to the embodiments.

Next, a device (pattern classifier device, learning device) according to the first or the second embodiment will be described in terms of a hardware configuration with reference to FIG. 9. FIG. 9 is an explanatory drawing illustrating a hardware configuration of the device according to the first or the second embodiment.

The device according to the first or the second embodiment includes a control unit such as a CPU (central processing unit) 51, storage units such as a ROM (read only memory) 52 and a RAM (Random Access Memory) 53, a communication I/F 54 that performs communication through connection to a network, and a bus 61 connecting the above units together.

A program to be executed by the device according to the first or the second embodiment is incorporated in advance into the ROM 52, for example, to be provided.

The program to be executed by device according to the first or the second embodiment may be stored in the form of an installable file or an executable file in a computer-readable storage medium such as a CO-ROM (compact disk read only memory), a FD (flexible disk), a CD-R (compact disk recordable), and a DVD (digital versatile disk), and be provided as a computer program product.

Further, the program to be executed by the device according to the first or the second embodiment may be stored in a computer connected to a network such as the Internet, and be downloaded via the network so that the program is provided. Moreover, the program to be executed by the device according to the first or the second embodiment may be provided or distributed via a network such as the Internet.

The program executed by the device according to the first or the second embodiment is capable of allowing a computer to function as each of the units of the device described above. The computer can execute the program that the CPU 51 has read from a computer-readable storage medium onto a main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A pattern classifier device for determining whether an input pattern belongs to a class that is divided into a plurality of subclasses, the device comprising a processor that operates as:
   a reception unit that receives the input pattern and attribute information of the input pattern;
   a decision unit that decides the subclass to which the input pattern is to belong, based on at least the attribute information;
   an execution unit that
     determines whether the input pattern belongs to the class, using a weak classifier allocated to the decided subclass, and
     outputs a result of the determination and a reliability of the weak classifier;
   a calculator that calculates an integrated value obtained by integrating an evaluation value based on the result of the determination and the reliability; and
   a determination unit that
     determines whether a termination condition of determination processing performed by the decision unit, the execution unit, and the calculator, has been satisfied,
     repeats the determination processing when the termination condition has not been satisfied, and
     terminates the determination processing and output the integrated value at the time of the termination when the termination condition has been satisfied.

2. The device according to claim 1, wherein the decision unit decides the subclass to which the input pattern is to belong, based on the input pattern and the attribute information.

3. The device according to claim 1, wherein the processor further operates as:
   a sound input unit that receives a sound;
   a candidate generation unit that generates at least one candidate for a phoneme contained in the sound; and
   a candidate selection unit, wherein
   the reception unit receives the at least one candidate as the input pattern,
   the determination unit determines whether the at least one candidate belongs to the class based on the integrated value, and
   the candidate selection unit selects a candidate from the at least one candidate based on a result of determination by the determination unit.

4. A pattern classifying method executed by a pattern classifier device for determining whether an input pattern belongs to a class that is divided into a plurality of subclasses, the method comprising:
   receiving the input pattern and attribute information of the input pattern;

deciding a subclass to which the input pattern is to belong, based on at least the attribute information;

determining whether the input pattern belongs to the class, using a weak classifier allocated to the decided subclass, and outputting a result of the determination and a reliability of the weak classifier;

calculating an integrated value obtained by integrating an evaluation value based on the result of the determination and the reliability;

determining whether a termination condition of determination processing performed at the deciding, the determining and outputting, and the calculating, has been satisfied;

repeating the determination processing when the termination condition has not been satisfied; and terminating the determination processing and outputting the integrated value at the time of the termination when the termination condition has been satisfied.

5. A computer program product comprising a non-transitory computer-readable medium containing a program executed by a computer, the program causing the computer to execute:

receiving an input pattern and attribute information of the input pattern;

deciding a subclass to which the input pattern is to belong, based on at least the attribute information;

determining whether the input pattern belongs to the class that is divided into a plurality of subclasses, using a weak classifier allocated to the decided subclass, and outputting a result of the determination and a reliability of the weak classifier;

calculating an integrated value obtained by integrating an evaluation value based on the result of the determination and the reliability;

determining whether a termination condition of determination processing performed at the deciding, the determining and outputting, and the calculating, has been satisfied;

repeating the determination processing when the termination condition has not been satisfied: and terminating the determination processing and outputting the integrated value at the time of the termination when the termination condition has been satisfied.

6. A learning device comprising:

a storage that stores a plurality of division rules for dividing input patterns into subclasses based on respective attribute information of the input patterns; and a processor that operates as:

a division unit that divides plural pieces of learning data including the input pattern and a weight into plural pieces of subclass data corresponding to subclasses according to the division rules and the attribute information;

a search unit that searches a plurality of weak classifiers for a weak classifier with a high degree of compatibility with the subclass data, for each of the pieces of subclass data;

a rule selection unit that
calculates respective reliabilities of the weak classifiers searched for, and
selects the division rule for the weak classifier with a high reliability from the plurality of division rules; and an updating unit that updates the weight included in the learning data based on the reliability of the weak classifier for the selected division rule.

7. A learning method executed by a learning device that includes rule storage that stores a plurality of division rules for dividing input patterns into subclasses based on attribute information of the input pattern, the method comprising:

dividing plural pieces of learning data including the input pattern and a weight into plural pieces of subclass data corresponding to subclasses according to the division rules and the attribute information;

searching a plurality of weak classifiers for a weak classifier with a high degree of compatibility with the subclass data, for each of the pieces of subclass data;

calculating respective reliabilities of the weak classifiers searched for;

selecting the division rule for the weak classifier with a high reliability from the plurality of division rules; and updating the weight included in the learning data based on the reliability of the weak classifier for the selected division rule.

* * * * *